July 23, 1963 J. V. MARTENS 3,098,937
COMBINED LIMITER AND TWO SECTION BANDPASS FILTER
Filed Dec. 30, 1959
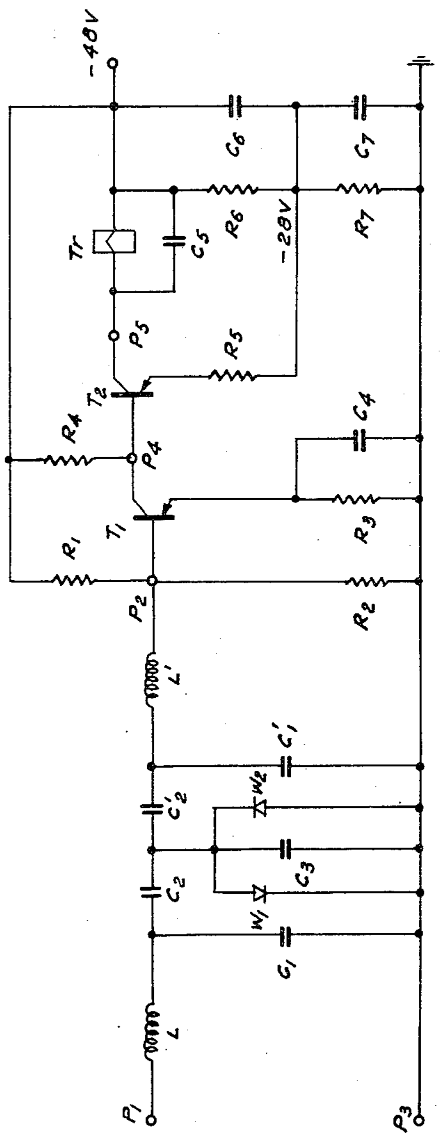
Inventor
J.V. MARTENS
By C.H. Suydam
AGENT United States Patent Office 3,098,937

Patented July 23, 1963

3,098,937

COMBINED LIMITER AND TWO SECTION BANDPASS FILTER

Jean Victor Martens, Antwerp, Belgium, assignor to International Standard Electric Corporation, New York, N.Y., a corporation of Delaware Filed Dec. 30, 1959, Ser. No. 862,818
Claims priority, application Netherlands Jan. 19, 1959
5 Claims. (Cl. 307—88.5)

The invention relates to a signal receiver and more particularly to a receiver suitable for the so-called multifrequency systems.

Multifrequency signalling systems are generally understood to consist in the transmission of signals each of which corresponds with a particular combination of two or more signals of distinct frequencies, taken out of a group of such frequencies. Any combination of frequencies consists in a constant number thereof and this is a useful safeguard since one may readily differentiate between a true signal and a false one consisting of less or more than the predetermined number of frequencies simultaneously transmitted. Thus, if there are $m$ frequencies which may be used, and if each signal consists in the transmission of $n$ such frequencies at a time, the total number of distinct signals is equal to $$\frac{m1}{n1(m-n)1}$$

e.g. 10, 15 and 56 distinct signals for two out of five, two out of six and three out of eight codes.

Such multifrequency signalling systems are already well known and one may for instance refer to the U.S. Patent No. 2,826,638.

Such multifrequency signalling systems generally use voice frequencies and possess various advantages. Nevertheless, multi-frequency signalling systems raise a certain number of problems. This will be particularly the case if it should be desired to use such an arrangement in telephone systems. Therein, the system might be used to provide signalling means between various exchanges which may either be toll centres, zone centres or local exchanges. The transmission equipment will generally be associated with a register which may have to exchange information with registers distributed over several more or less distinct stations. This means that the transmission losses between a multifrequency centre and a multifrequency receiver over a two-wire connection may vary over a rather wide range, which may be as high as 30 decibels.

Particularly in view of the wide level variations which may be expected between the signal transmitter and the signal receiver, the latter can probably be considered as the most difficult part of the apparatus to be designed. The wide level variations imply that for a signal arriving at the lowest level admitted, and even under adverse conditions of power supply, temperature, noise, etc., the receivers tuned to the corresponding frequency constituting the signal should respond correctly. On the other hand, any signal arriving at the highest possible level should only act on the receivers tuned to the corresponding frequencies, without producing any response for the other receivers.

These conditions which are particularly severe when wide level differences must be taken into consideration, could theoretically be satisfied by a receiver incorporating a very selective bandpass filter. The discrimination of this filter between the frequency range of a particular receiver and the frequency ranges of the other receivers should be equal to the level variation of 30 decibels mentioned above, plus a margin including all possible variations in the sender output level and in the receiver sensitivity.

Assuming for example a bidirectional multifrequency signalling transmission scheme permitting to transmit fifteen signals in either direction by the use of a two out of six code, twelve distinct frequencies must therefore be provided if simultaneous signalling in the two directions and on the same two-wire line is contemplated. Using voice frequencies, a reasonable overall bandwidth would be that between 500 and 2000 cycles per second. For such an example, with the twelve frequencies forming an arithmetic progression, the largest possible frequency spacing between two adjacent frequencies would be about 136 cycles per second. If closer spacing is desired, the cost of the receiver filter will increase, and the relation between cost and frequency spacing is evidently a discontinuous one since below certain frequencies it is necessary to add elements to the filter. A particularly sharp increase in the cost of the filter would be required if the frequency spacing grew below 100 cycles per second. Therefore, a reasonable spacing might be 120 cycles per second corresponding to that used for multichannel telegraph systems. In such a case, an example of frequency allocation might be the six frequencies from 540 to 1140 with steps of 120 cycles per second in the backward direction, and the six frequencies from 1380 to 1980 with steps of 120 cycles per second in the forward direction.

Even then, the design of the receiver bandpass filter leads to a rather complicated and costly filter, with the result that the economical value of such a system as envisaged above might be doubtful.

An object of the invention is to realize a signal receiver for a multifrequency signalling system in which relatively wide level variations may occur, with a reasonably simple bandpass filter due to the introduction of a limiter circuit associated with said filter.

It is to be noted that the use of a limiter amplifier which is used in common for the various individual tuned receivers is already contemplated in the U.S. patent referred to above in order that a weak incoming signal may be amplified to a value satisfactory for the operation for the individual channel receiver, while a strong signal is predetermined to a maximum value. The present invention however envisages the use of a relatively simple limiter circuit individually associated to each signal receiver and particularly cooperating with the bandpass filter thereof so as to considerably simplify the design of the actual filter.

While a limiter circuit will be able to cater for the largest part of the expected level variations, the introduction of such a non-linear circuit in the signal receiver gives rise to phenomena which are characteristic of non-linear circuits handling more than one frequency simultaneously. In this respect, one may refer to the Belgian Patent No. 510,949 where such effects were already considered.

Briefly, the first effect is an intermodulation of two frequencies which may simultaneously be present at the input of the receiver. A consequence of the intermodulation is the production of sum and difference freqpencies of the fundamental waves and of their harmonics. These intermodulation products may coincide with one of the signalling frequencies and give rise to false operations of the corresponding receivers.

For example, if the frequencies used form an arithmetic progression, the second harmonic of any frequency minus the next higher or lower frequency is respectively equal to the next lower or higher frequency. Moreover, it may be desirable to choose the frequencies so that they all are odd harmonics of half the frequency spacing so that the even harmonic and particularly the second harmonic of the lower frequencies will never coincide with any of the higher frequencies. Then, further undesirable intermodulation products may arise, since any frequency is equal to the difference between the $r$th harmonic of the next higher frequency and the $(r+1)$th harmonic of the next lower frequency, $2r+1$ representing the ratio between the imitated frequency and half the frequency spacing.

Saturation is a second result of the introduction of non-linear circuits. When two waves of distinct frequencies are applied simultaneously to the input of a limiter, the output energy of this output limiter will be distributed over several frequencies, namely the fundamental frequencies and all the intermodulation products. The output level for each fundamental frequency will depend on the relative levels of the two frequencies at the limiter input. When these levels are very different, the frequency arriving at the lowest level will have a tendency to vanish at the output of the limiter. Thus, the reception of an incoming frequency may be hampered by any other frequency arriving, at a sufficient level, in the limiter circuit of its particular receiver.

In accordance with a first characteristic of the invention, a signal receiver adapted to react to a particular frequency or to a relatively narrow range of frequencies and to be unresponsive to other frequencies, said receiver comprising an amplifier, a limiter and a bandpass filter and being adapted to relatively wide level differences of input signals, is characterised in that said bandpass filter is split into a first part cascaded with a second part and with said limiter at the junction of said two parts.

The insertion of the limiter inside the filter permits to reduce the saturation effect mentioned above and due to that part of the filter which precedes the limiter. On the other hand, the remaining part of the filter following the limiter permits to render the limiter really effective. In other words, the first part of the filter permits to avoid the undesirable intermodulation effects mentioned above.

In accordance with a further characteristic of the invention, each of said parts of the bandpass filters are in themselves frequency selective, i.e. they each include a tuned circuit.

The purpose of the first tuned circuit part of the overall bandpass filter will be to prevent the frequencies foreign to the particular receiver from reaching the limiter circuit at a level sufficient to produce intermodulation or to hamper the transmission of the wanted frequency. The second tuned circuit following the limiter is however essential since the combination of the first tuned circuit with the limiter alone would generally not give sufficient discrimination. This is because the advantage of the limiter circuit resides in the fact that, at its output, the level differences are attenuated to such an extent that the required frequency discrimination between the wanted frequency and the undesirable ones, is easily obtained with the help of a simple selective circuit following the limiter.

With a distribution of the total amount of linear filtering circuits respectively before and after the limiter circuit, conditions arising from the transient response of the complete filter may have to be taken into account, especially when the latter is used in a multi-frequency signal receiver since voltage surges occurring on the transmission line should not give rise to false-operations of the receivers. Signal pulses containing essentially another frequency than the intrinsic frequency of the receiver should not give rise to any response. These pulses will however generally contain a small percentage of energy falling within the frequency bandwith of the receiver considered. If these pulses are applied at a high energy level, this small percentage of energy would however generally be sufficient to operate a receiver equipped with a mere linear band filter. In this respect, increasing the amount of filtering in the receiver would be useless. Then, the only solution in the case of purely linear filters in the receiver would be the rather awkward one of passing the pulses at the sending end through filters providing roughly the same discrimination as the receiver filters.

However, the introduction of a limiter in the manner proposed above modifies the transfer characteristic of the receiver filters for short bursts of energy at a frequency within the passband. At the filter input, these frequencies may be present in pulses to be received by receivers tuned to adjacent frequencies, at the beginning and at the end of these pulses. The corresponding energy is concentrated in short time intervals and may occur at a high power level.

Thus, if the limiter could be located right at the filter output, it would absorb these undesirable bursts of frequency with an ideal efficiency. Further away from the filter input, the limiter becomes less efficient because the energy to be absorbed spreads over a longer time interval and this passes the limiter more completely.

Since on the other hand an input limiter offers the drawbacks of saturation and intermodulation effects mentioned above, the optimum solution now proposed consists in having an input part of the filter which is just sufficient to avoid the troubles due to these effects.

The above mentioned and other objects and characteristics of the invention will be better understood from the following detailed description of an embodiment of the invention to be read in conjunction with the accompanying drawing which represents one of a series of similar tuned signal receivers using transistors for a multifrequency signalling scheme.

As shown on the figure, the signal receiver consists essentially in three parts: an input bandpass filter using coils and condensers and also incorporating a limiter circuit, a class A transistor amplifier using the transistor $T_1$, and finally an output amplifier stage using the transistor $T_2$.

As shown, the bandpass filter which may for instance be designed to operate between impedances of 600 ohms is the symmetrical but unbalanced type. The ungrounded input terminal $P_1$ of the filter and of the signal receivers is connected to the output terminal $P_2$ of the filter which corresponds to the input terminal of the Class A amplifiers through the impedance L, the condenser $C_2$, the condenser $C_2'$, the inductance $L'$, all in series and in that order. The junction point of the inductance L with the condenser $C_2$ is connected to ground at terminal $P_3$ through the shunt condenser $C_1$. Likewise, the shunt condenser $C_1'$ is connected between ground and the junction point of condenser $C_2'$ within inductance $L'$. A further shunt condenser $C_3$ is connected between ground and the junction point of condensers $C_2$ and $C_2'$. To this last junction point are also connected the rectifiers $W_1$ and $W_2$, the cathode of $W_1$ being grounded while the anode of $W_2$ is also grounded.

As noted, the band pass filter is symmetrical and the elements indicated with primes have the same values as the corresponding unprimed elements. Without considering the limiter, the bandpass filter shown could be reduced to a simpler circuit in which there would be a single series condenser of value $$\frac{C_2^2}{2C_2+C_3}$$

and two shunt condensers corresponding to $C_1$ and $C_1'$ but having values of $$C_1+\frac{C_2C_3}{2C_2+C_3}$$

Then, these equivalent shunt condensers in conjunction with the inductance L determine the frequency to which the receiver is tuned. Thus, there are an input and an output tuned circuit, tuned to the same frequency and capacitively coupled. The coupling factor $k$ may be taken as the ratio between the equivalent series condenser mentioned above and the sum of this equivalent series condenser plus the value of one of the equivalent shunt condensers also defined immediately above.

The limiter shown to be connected across the shunt condenser $C_3$ acts therefore on the coefficient of coupling, without any appreciable reduction of the Q factor of the resonant circuits.

The threshold above which the limiter operates is determined by the characteristics of $W_1$ and $W_2$, which may be embodied by silicon rectifiers requiring a certain bias to become conductive.

As soon as the voltage across $C_3$ is well beyond the threshold voltage, the output from the filter depends on the transmission characteristic of $C_2'$, $C_1'$ and L', i.e. on the frequency of the incoming signal. Variations of the input level have in this condition but little influence on the output. The only secondary effect of the voltage limitation is a shift of the passband to the lower frequencies due to the increase of the effective tuning condenser. Indeed, since condenser $C_3$ is then short-circuited, the effective tuning condenser is now $C_1+C_2$ instead of $$C_1+\frac{C_2C_3}{2C_2+C_3}$$

This frequency shift should be taken into account when tuning the resonant circuits.

At first sight, condenser $C_3$ could be left out of the circuit shown, with a corresponding change in the values of the other condenser and particularly $C_2$ and $C_2'$ which would have to be reduced. However, the impedance between which the limiter operates for various receivers tuned to the various individual frequencies, would then depend on the particular individual frequency and it would be difficult to choose a single type of recitifier which could be used for the complete series of signal receivers. The threshold voltages for the limiters used in the various signal receivers may be the same provided that the impedance seen at the junction point of the two rectifiers is independent of the frequency to be transmitted.

This may be shown as follows: First of all, the absolute bandwidth of the filter may be independent of frequency when equal spacings between the frequencies are used. To take a practical example, with a frequency spacing of 120 cycles per second, and taking into account all possible tolerances, both at the receiving and at the sending end, a bandwidth of 48 cycles per second may be used for each receiver. Then, from 24 cycles per second above or below the centre frequency, the attenuation should rise and reach a sufficient value from 120—24=96 cycles per second away from the centre frequency, when the bandwidth of the adjacent signal receiver is reached.

With such an absolute bandwidth of the filter independent of frequency, the Q factors of the resonant circuits should be proportional to the frequency. In other words, the inductance of the coils can be the same for an frequencies if their series resistance is constant. This very useful condition which permits to standardize the coils for all the voice frequency receivers may be satisfied by using ferrite coils.

With L being a constant inductance, irrespective of the frequency to which the receiver is tuned, and with the effective series resistance of that coil independent of frequency, the ratio between the voltage across condenser $C_1$ and the input voltage between input terminals $P_1$ and $P_3$ will be proportional to the frequency to which the signal receiver is tuned. If, as stated above, the limiter circuit is to be the same for all the signal receivers irrespective of the frequency to which they are tuned, the ratio between the voltage across condenser $C_3$ and that at the input of the receiver between terminals $P_1$ and $P_3$ should be the same for all the signal receivers. This means therefore that the ratio between the voltage across condenser $C_3$ and that across condenser $C_1$ should be inversely proportional to the frequency.

It is also desirable that for all the signal receivers, the product $k$Q should be constant for all the signal receivers, $k$ being the coupling factor of the filter. Since it has been mentioned above that the Q factor should be proportional to the frequency, $k$ should therefore be inversely proportional to the frequency, and hence should be smaller for the signal receivers tuned to the higher frequencies.

The ratio between the voltage across condenser $C_3$ and and that across condenser $C_1$ can be reckoned approximately by considering only the network of the five condensers $C_1$, $C_2$, $C_3$, $C_2'$ and $C_1'$. Then, this voltage ratio will be equal to $$\frac{s}{x}=\frac{C_2(C_1+C_2)}{(C_1+C_2)(C_2+C_3)+C_1C_2} \qquad (1)$$

where $s$ represents the value of the ratio for the signal receiver tuned to the lowest frequency and $x$ is a dimensionless parameter directly proportional to the frequency and equal to unity for the lowest frequency to which a signal receiver is tuned.

Likewise, the coupling factor which should also be inversely proportional to the frequency may readily be computed as previously explained by considering a pi condenser network (not shown) equivalent to the five-condenser network of the figure. Then, this coupling factor defined by $$\frac{k}{x}=\frac{C_2^2}{(C_1+C_2)(C_2+C_3)+C_1C_2} \qquad (2)$$

where $k$ is the coupling factor corresponding to the lowest frequency to which a signal receiver is tuned.

From the relations (1) and (2) one may readily obtain $$\frac{C_1}{C_2}=\frac{s-k}{k} \qquad (3)$$

$$\frac{C_3}{C_2}=\frac{x+k-2m}{s} \qquad (4)$$

Thus, since there is another relation determining the frequency to which the signal receiver is tuned, the values of all the condensers are now determined. Adjustment to the final exact values may then be secured experimentally.

Since $C_3$ has some influence on the determination of the tuned frequency, as it is included in the effective tuning condenser previously mentioned, and since this effective tuning condenser is merely equal to $C_1+C_2$ when the limiter exerts its short circuiting action, it might be desirable that the value of $C_3$ should not be too low in order to limit the frequency shift. However this may in fact be a secondary effect and where space is at a premium, it will be found more advantageous instead to limit the size of the condensers to a minimum. The value of $C_3$ will be the determining factor and the smallest values for the condensers will be obtained when $C_3$ is equal to zero and hence can be omitted, for the lowest signalling frequency, i.e. when $x$ is equal to unity. From (4) one thus obtains the following condition between $s$ and $k$ $$s=\frac{1-k}{2k} \qquad (5)$$

and (3) and (4) respectively become $$\frac{C_1}{C_2}=\frac{1-k}{2k} \qquad (6)$$

$$\frac{C_3}{C_2}=\frac{2(x-1)}{1+k} \qquad (7)$$

It will be observed from (6) and (7) as well as from (3) and (4) that $$\frac{C_1}{C_2}$$

is constant or substantially so, while $$\frac{C_3}{C_2}$$

is a linear function of the signalling frequency.

It should be observed that the rectifiers $W_1$ and $W_2$ constituting the limiter are connected with opposite polarities directly across the condenser $C_3$, due to these rectifiers, i.e. silicon diodes, necessitating a small positive bias to make them conductive. With other types of diodes, e.g. germanium, some external biasing would be required for the rectifiers. In this case, the cathode of $W_1$ and the anode of $W_2$ would not be directly connected to ground but might be biased to some suitable potential, preferably derived from the emitter circuit to the class A amplifier comprising the transistor $T_1$. Some degree of asymmetry in the back biasing of the limiter rectifiers might in fact be tolerable.

Actually, even with the circuit shown, it might be found of some advantage to disconnect the cathode of the rectifier $W_1$ from ground and to bias it to a potential which would become negative as a result of spurious input signals such as inductive kicks and such like. In this case, such spurious signals could not cause an undesired operation of the signal receiver, as this would lead to both rectifiers $W_2$ and $W_1$ becoming conductive.

Terminal $P_2$ constituting the output of the filter also corresponds to the input of the class A amplifier stage and it is connected to the base of the PNP transistor $T_1$ and also to the negative battery potential of −48 volts through resistor $R_1$, and finally to ground at terminal $P_3$ through resistor $R_2$. Transistor $T_1$ is operated in grounded emitter fashion, and the emitter is connected to ground through resistor $R_3$ which is of a relatively high value, and shunted by decoupling condenser $C_4$ also of suitably high value. Thus, the base of transistor $T_1$ is biased by the potentiometer formed by resistors $R_1$ and $R_2$, and a transistor arrangement with closely controlled and stabilized current gain is obtained. A 2N524 transistor may be used for $T_1$ whose collector is biased to the negative battery potential through resistor $R_4$.

The collector of transistor $T_1$ is directly connected at terminal $P_4$ to the base of transistor $T_2$ which is a high current gain transistor, e.g. OC76 and which gives the output signal at its collector connected to terminal $P_5$, its emitter being biased to a potential of −28 volts through resistor $R_5$. Terminal $P_5$ is connected to negative battery through the winding of the output relay *Tr* which is shunted by a by-pass condenser $C_5$. Finally, the bias potential of −28 volts is obtained as shown by a potentiometer constituted by the resistors $R_6$ and $R_7$ between negative battery and ground, these resistors being respectively shunted by the bypass condensers $C_6$ and $C_7$.

When no signal is received, transistor $T_2$ is blocked as the base voltage is at lowest equal to about −24 volts whereas the emitter of this PNP transistor is biased to −28 volts. When a signal is received and is of sufficient strength to counteract the reverse bias voltage, collector current starts to flow in $T_2$ and the relay *Tr* will be operated. A sharp increase in the D.C. output current of transistor $T_2$ may be obtained when the input signal reaches a predetermined value and this output current may become practically independent of the signal level. The arrangement may be designed so that the relay operates when the collector current of $T_2$ reaches 4 milliamperes, whereas it remains unoperated as long as this collector current does not reach 2 milliamperes. In this manner, the operating level at the signal receiver input may thus be practically independent of the relay sensitivity. The low $I_{co}$ value will be particularly useful if a relay with a low release current is used.

While the principles of the invention have been described above in connection with specific apparatus, it is to be clearly understood that this description is made only by way of example and not as a limitation on the scope of the invention.

I claim:

1. In a signal receiver for receiving signals lying within a predetermined range of frequencies and having varying amplitudes, a symmetrical bandpass filter of the unbalanced type having an input section and an output section capacitively coupled for passing signals lying within said range, each of said sections of said filter comprising a tuned circuit, thereby rendering each section frequency selective, said filter further comprising a first and second circuit branch with a first inductance, a first and second condenser and a second inductance in series in said first circuit branch, a third, fourth and fifth condenser connected between the second circuit branch and the junction points between said first inductance and said first condenser, between the said first and second condensers, and between the said second condenser and said second inductance, respectively, and a signal amplitude limiter circuit being connected between the second filter circuit branch and the junction point of said first and second condensers.

2. A signal receiver as claimed in claim 1 wherein said first and second inductances have a fixed inductance value irrespective of the individual frequency to which the signal receiver is tuned and the Q factor of the said inductances increases substantially linearly with the frequency.

3. A signal receiver as claimed in claim 1 wherein said fourth condenser has a capacitance value such that the ratio between the voltage across said fourth condenser and the input voltage of said bandpass filter remains substantially constant regardless of the frequency to which the receiver is tuned.

4. A signal receiver as claimed in claim 1, wherein said limiter comprises two oppositely poled rectifiers, each connected between the said second circuit branch and the junction of said second and third condensers.

5. A signal receiver as claimed in claim 4 wherein each of said rectifiers are connected in shunt with said fourth condenser and wherein said rectifiers are of the type requiring forward biasing for conductivity.

References Cited in the file of this patent

UNITED STATES PATENTS

| | | |
|---|---|---|
| 2,369,621 | Travis | Feb. 13, 1945 |
| 2,485,731 | Gruen | Oct. 25, 1949 |
| 2,616,967 | Buekeman | Nov. 4, 1952 |
| 2,892,080 | Chauvin et al. | June 23, 1959 |
| 2,912,573 | Mitchell | Nov. 10, 1959 |
| 2,930,005 | Tautner | Mar. 22, 1960 |
| 3,012,197 | Peterson et al. | Dec. 5, 1961 |
| 3,012,202 | Waters | Dec. 5, 1961 |